US007843973B2

(12) United States Patent
Joo et al.

(10) Patent No.: US 7,843,973 B2
(45) Date of Patent: Nov. 30, 2010

(54) METHOD AND APPARATUS FOR CONSTITUTING TRANSPORT NETWORK BASED ON INTEGRATED SYNCH AND ASYNCH FRAME

(75) Inventors: Seong-Soon Joo, Daejeon (KR); Young-Sik Chung, Daejeon (KR); Tae-Joon Park, Daejeon (KR); Jeong-Dong Ryoo, Daegu (KR); Jong-Tae Song, Daejeon (KR); Bong-Wan Kim, Daejeon (KR); Jee-Yon Choi, Daejeon (KR); Jin-Young Lee, Seoul (KR); Byung-Sun Lee, Daejeon (KR); Kyung-Pyo Jun, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 527 days.

(21) Appl. No.: 11/720,164

(22) PCT Filed: Nov. 25, 2005

(86) PCT No.: PCT/KR2005/003997

§ 371 (c)(1),
(2), (4) Date: May 24, 2007

(87) PCT Pub. No.: WO2006/057525

PCT Pub. Date: Jun. 1, 2006

(65) Prior Publication Data
US 2008/0107136 A1    May 8, 2008

(30) Foreign Application Priority Data
Nov. 25, 2004    (KR)    .................... 10-2004-0097711

(51) Int. Cl.
*H04J 3/06*    (2006.01)

(52) U.S. Cl. .................................................. 370/503
(58) Field of Classification Search ...................... None
See application file for complete search history.

(56) References Cited

U.S. PATENT DOCUMENTS 6,574,226 B1    6/2003    Nakano et al.

(Continued)

FOREIGN PATENT DOCUMENTS

| KR | 1995-0004798 | 2/1995 |
|---|---|---|
| KR | 1998-013893 | 5/1998 |
| WO | 97/10653 | 3/1997 |
| WO | 99/62224 | 12/1999 |
| WO | 2006/057525 | 6/2006 |

OTHER PUBLICATIONS

PCT International Search Report for Application No. PCT/KR2005/003997; Date of Mailing: Mar. 6, 2006.
PCT Preliminary Report on Patentability (Written Opinion) for Application No. PCT/KR2005/003997; Mail date Jun. 7, 2007.

*Primary Examiner*—Anh-Vu Ly
(74) *Attorney, Agent, or Firm*—Jae Y. Park; Kile Park Goekjian Reed & McManus PLLC

(57) ABSTRACT

Provided is a method for forming a customized-quality integrated transport network based on synch and asynch frames, and a transport network forming apparatus thereof. The method of the present invention includes: a) synchronizing a transmission bit rate in a network; b) when the transmission bit rate is synchronized in the network and a connection request is received, establishing a connection by determining a route and a start cycle time of the link based on a quality of the connection request and transporting it to nodes of the link; and c) transmitting data to be transported to a link of an adjacent node within the virtual cycle time when the data are synch frames; or when the data are asynch frames and the data are not transmitted within a virtual cycle time of a link to be switched, keeping the data waiting for a next cycle time.

18 Claims, 9 Drawing Sheets

U.S. PATENT DOCUMENTS

| | | |
|---|---|---|
| 6,594,279 B1 | 7/2003 | Nguyen et al. |
| 6,628,657 B1 | 9/2003 | Manchester et al. |
| 6,744,772 B1 * | 6/2004 | Eneboe et al. .............. 370/400 |
| 6,798,779 B1 | 9/2004 | Shimbashi et al. |
| 6,928,126 B2 * | 8/2005 | Ono et al. ................... 375/359 |
| 6,934,249 B1 * | 8/2005 | Bertin et al. ................ 370/218 |
| 7,002,926 B1 * | 2/2006 | Eneboe et al. ............. 370/255 |
| 7,187,655 B1 * | 3/2007 | Sato et al. ................... 370/252 |
| 2002/0018468 A1 * | 2/2002 | Nishihara ................... 370/389 |
| 2002/0027928 A1 * | 3/2002 | Fang .......................... 370/468 |
| 2002/0191588 A1 * | 12/2002 | Personick ................... 370/352 |
| 2004/0076187 A1 * | 4/2004 | Peled ......................... 370/514 |
| 2005/0117530 A1 * | 6/2005 | Abraham et al. ............ 370/310 |
| 2005/0232307 A1 * | 10/2005 | Andersson et al. .......... 370/503 |
| 2005/0243846 A1 * | 11/2005 | Mallila ....................... 370/412 |
| 2006/0077949 A1 * | 4/2006 | Allen et al. ................. 370/350 |

\* cited by examiner

METHOD AND APPARATUS FOR CONSTITUTING TRANSPORT NETWORK BASED ON INTEGRATED SYNCH AND ASYNCH FRAME

TECHNICAL FIELD

The present invention relates to a transport network guaranteeing customized end-to-end quality based on integration of synchronous and asynchronous frames; and, more particularly, to a customized-quality integrated transport network that can provide a service quality requested by each user out of qualities of all ranges in an end-to-end link through a single transport network based on both synch and asynch frames.

BACKGROUND ART

Transport technology includes other related technologies used to exchange and transmit information between communication service users, such as a network structure, a switching method, transmission system, and transformation of information into the format for transport layer to equally provide an information transport service to all users of a transport network.

In case of a telephone service network transmitting speech signals between network users, the technologies applied thereto include an entire numbering system, a hierarchical network configuration, a Dual-Tone Multi-Frequency (DTMF) signaling between a user and a transport network, a CCS No. 7 Signaling within a transport network, a fixed bandwidth provided to each user based on 64 Kbps circuit switching, a transmission based on synch multiplexing, and transformation from speech analog signals into digital signals based on pulse code modulation.

Conventional transport technologies are developed to apply resources efficiently according to characteristics of a service provided to the network users. The telephone service network employs a circuit switching method that can minimize an end-to-end delay and delay shift of a speech signal which are needed for natural conversation between the network users. The Internet adopts a packet switching method to transmit data having a variable length, i.e., variable-length data, without loss and increase the utilization efficiency of network resources, and mobile telecommunications networks have called for development of signaling methods for positioning a network user and exchanging positioning information.

In the conventional transport technologies, when a system needs to accommodate a service which is different from the characteristics of a service aimed by each transport technology, the service quality which is expressed as the extent of service characteristics satisfied by the transport network cannot be fulfilled. Otherwise, to fulfill the service quality, the system should take the disadvantages that the network resources are used less efficiently and the transport technology become more complicated to fulfill the service quality.

Recently, communication services are advancing through integration between services and the concept of easy-to-use services, and researchers attempt to integrate transport technologies to jump on the trend. That is, researchers are studying to develop a transport network configuration, a switching method, a transmission system, and transformation into an information transport layer to integrate and process diverse information transport schemes with different service qualities requested by the users. When they are integrated into one transport technology, a network service provider can reduce costs for managing the network and the users can receive a service in a desired service quality without making an enrollment for each service quality.

The services provided to the users through the transport network become to have higher service qualities from speech, message and video services to integrated forms thereof. The users of the transport network request to change the service quality standards, as the services are extended into an area of machine-to-machine information transport. The service quality standards include how much of a bandwidth requested in a fold number of the minimum bandwidth from several Kbps to several Gbps can be guaranteed in end-to-end, how much information can be lost when information is transported in end-to-end, and the extents of end-to-end transport delay and inter-delay shift. The service quality requested by a user of the transport network is formed of an arbitrary combination of service quality measures, and the transport network should provide a customized service quality according to a user service.

DISCLOSURE

Technical Problem

It is, therefore, an object of the present invention to provide an apparatus and method for forming a transport network guaranteeing customized end-to-end quality based on integration of synchronous and asynchronous frames, the apparatus and method that can provide a plurality of transport service qualities through one transport network up to service qualities not provided by conventional transport technologies in an end-to-end link without constructing transport networks for each service quality.

The other objects and advantages of the present invention can be understood by the following description and made clear with reference to preferred embodiments of the present invention. Also, it is obvious that the objects and advantages of the present invention can be realized by the means as claimed and combinations thereof.

Technical Solution

In accordance with one aspect of the present invention, there is provided a method for transporting synch and asynch frames, including the steps of: a) synchronizing a transmission bit rate in a network; b) when the transmission bit rate is synchronized in the network and a connection request is received, setting up a connection by determining a route between a source and destination and a start cycle time for transmitting frames at the source and by notifying the nodes on the route; and c) after the connection is set up, transmitting data requested to be transported to an adjacent node within the virtual cycle time based on a transmission control policy that is equally applied to the entire nodes of the network when the data are synch frames; or when the data are asynch frames and the data can not be transmitted within a virtual cycle time of a link to be switched, keeping the data waiting for a next cycle time and transmitting the data at the next cycle time.

In accordance with one aspect of the present invention, there is provided an apparatus for forming an integrated transport network for transporting synch and asynch frames, including: an area manager for transmitting/receiving a synchronization signal for synchronizing a transmission bit rate of a network, forming area control networks by switching control frames with nodes in a predetermined area, and setting up a connection by assigning a route and a start cycle time according to a quality requested from a user; a node manager for maintaing synchronous and asynchronous frames switching information by communicating with the area manager; and a data plane for switching user frames under control of the area manager and the node manager.

ADVANTAGEOUS EFFECTS

The present invention provides a method for temporally occupying a route and resources in an end-to-end link according to a probability that can satisfy a requested service quality in an entire network based on a method representing frames generated according to traffic characteristics of a service. The present invention also provides a method for forming a control network based on bitwise link state information provided by a synch frame and control message switching using an inter-node control frame. The technology of the present invention can provide a customized service quality requested by each user among service qualities of the entire range up to service qualities that are not provided by conventional transport technologies through a single transport network in an end-to-end link without forming transport networks of each quality to provide a plurality of transport service qualities.

DESCRIPTION OF DRAWINGS

The above and other objects and features of the present invention will become apparent from the following description of the preferred embodiments given in conjunction with the accompanying drawings, in which.

BEST MODE FOR THE INVENTION

The present invention provides an apparatus for forming an integrated transport network for implementing synch and asynch frame transport. The transport network forming apparatus includes: an area manager for transmitting/receiving a synchronization signal for synchronizing a transmission bit rate of a network, forming area control networks by switching control frames with nodes in a predetermined area, and setting up a connection by assigning a route and a start cycle time according to a quality required from a user; a node manager for maintaing synchronous and asynchronous frames switching information by communicating with the area manager; and a data plane for switching user frames under control of the area manager and the node manager.

MODE FOR THE INVENTION

Other objects and aspects of the invention will become apparent from the following description of the embodiments with reference to the accompanying drawings, which is set forth hereinafter. Thus, those skilled in the art of the present invention can easily implement the technological concept of the present invention. Also, if it is considered that detailed description on prior art may blur the point of the present invention, the description will not be provided herein. Hereinafter, preferred embodiments of the present invention will be described in detail with reference to the accompanying drawings.

Following description exemplifies only the principles of the present invention. Even if they are not described or illustrated clearly in the present specification, one of ordinary skill in the art can embody the principles of the present invention and invent various apparatuses within the concept and scope of the present invention.

The use of the conditional terms and embodiments presented in the present specification are intended only to make the concept of the present invention understood, and they are not limited to the embodiments and conditions mentioned in the specification.

In addition, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

Figure 1:
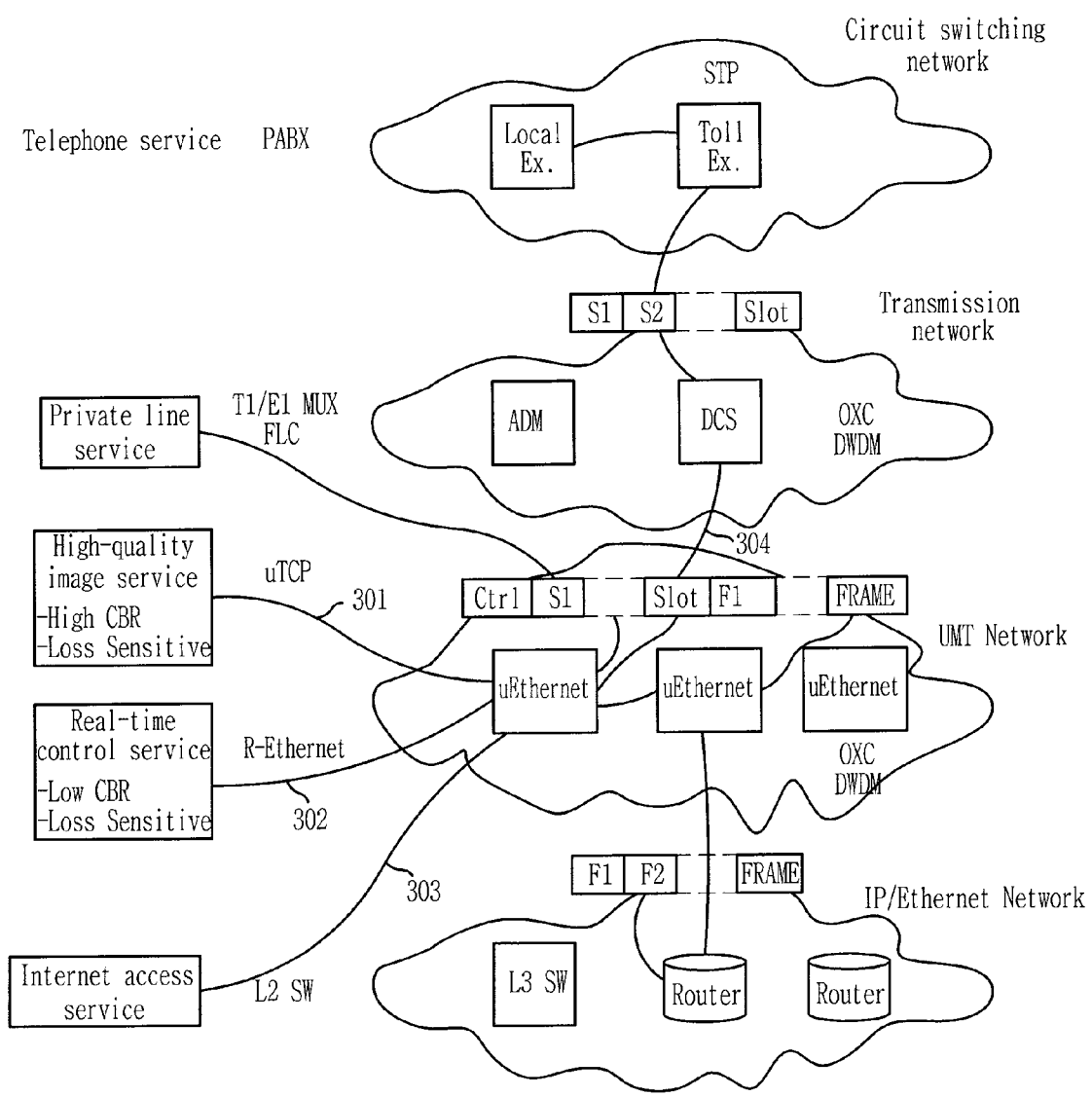
FIG. 1 is a diagram illustrating a customized-quality integrated transport network based on an synch and asynch frame in accordance with an embodiment of the present invention.

FIG. 1 is a diagram illustrating a customized-quality integrated transport network based on an synch and asynch frame in accordance with an embodiment of the present invention.

Referring to FIG. 1, the customized-quality transport network can accommodate new high-quality video service and real-time control service, which are not provided in conventional services, by using a Universal Media Transport (UMT) network. Conventional telephone and private line services use synch frames (see 301). Among Internet access services, application services having a high constant bit rate and a loss-sensitive application services utilize variable-length synch frames or slot-type fixed-length synch frames (see 302). Other services form a single network by using asynch frames (see 303). The customized-quality transport network can be connected to a telephone service network, a transmission network, and an Internet Protocol (IP)/Ethernet network, which accommodate the above-mentioned services, and it can integrate conventional transport networks into a single network (see 304).

Hereinafter, a method for transmitting both synch and asynch frames according to user service characteristics and user requested service quality in a single network will be described along with a structure of a switch.

Figure 2:
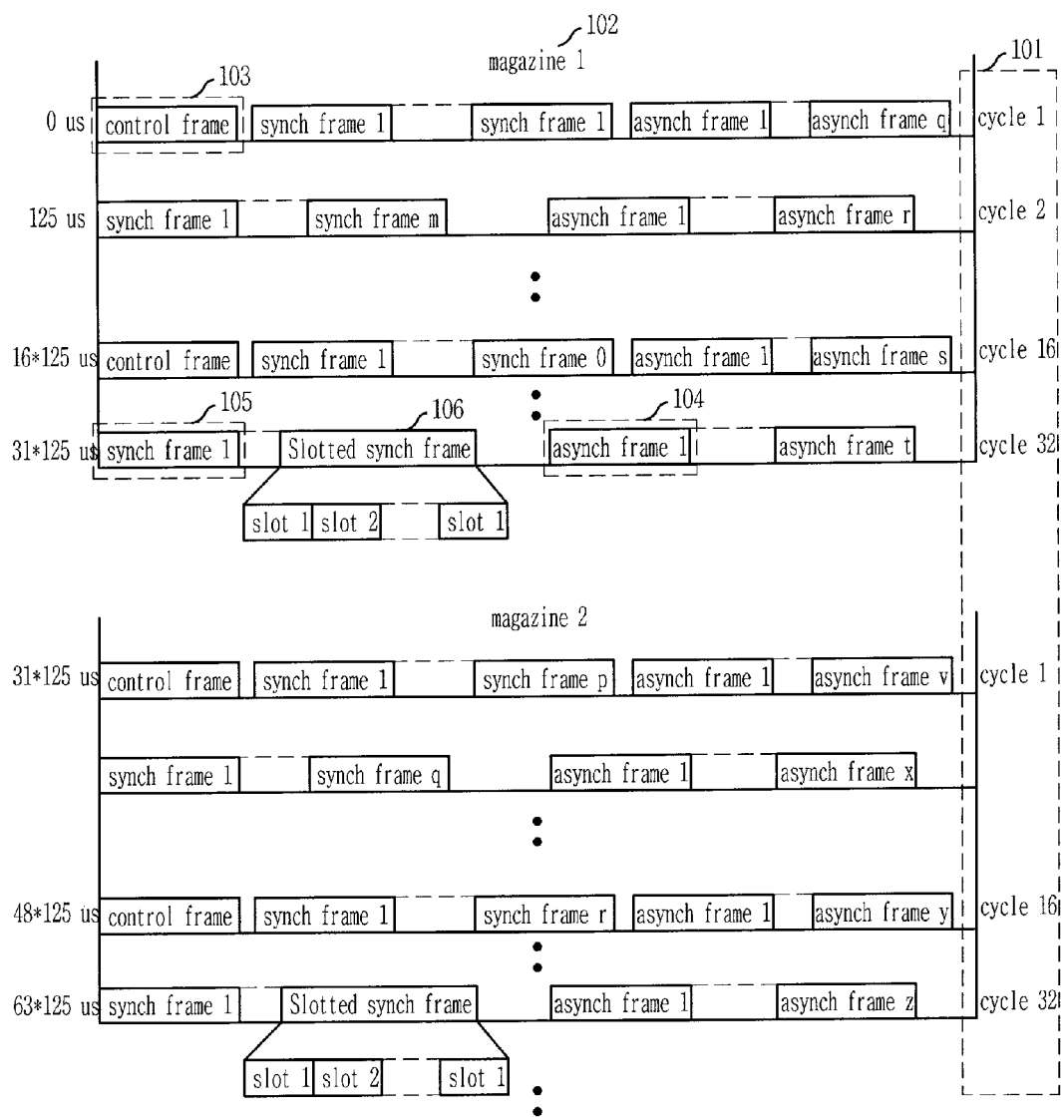
FIG. 2 is a diagram describing a virtual cycle time between nodes in the customized-quality transport network of FIG. 1, magazine structure, and a frame structure.

FIG. 2 is a diagram describing a virtual cycle time between nodes in the customized-quality transport network of FIG. 1, a magazine structure, and a frame structure.

Referring to FIG. 2, a virtual cycle time is defined on a basis of predetermined time by determining a link occupying time of the same standards in the entire network in order to provide a method for temporally distributing link resources of the entire network in every end-to-end link. Herein, 'virtual cycle time' denotes a predetermined time for repeating frame transmission control in a link connecting all transmission nodes of the network to adjacent nodes while the transmission bit rate is synchronized in the entire network (see 101). For example, when the virtual cycle time of the network is 125 us, all nodes of the network perform transmission control at every 125 us from a predetermined time point, perform switching based on frame switching information of a predetermined cycle time, and transmit switched frames based on a predetermined transmission control within 125 us. The frame switching information of each cycle time is modified at every time which is a predetermined multiple of the virtual cycle time, e.g., 16, 31, 32, 48 and 64. A group of a virtual cycle time during which transmission is controlled is defined as a magazine 102. The magazine is a unit for modifying the frame switching information for performing transmission control at each node constituting the network.

Referring to FIG. 2, frames are divided into data frames for transmitting user data in an end-to-end link and control frames 103 for transmitting control data in the customized-quality transport network. The data frames are divided again into synch frames whose time for frame switching is predictable and asynch frames 104 whose frame switching time is not regular. The synch frames also include variable-length synch frames 105 and slot-type fixed-length synch frames 106.

As shown in FIG. 2, a control frame exist within one magazine more than once, and the number of synch frames and asynch frames within a cycle time is variable and it is determined according to the state of resources between two nodes and a routing policy of an area. If there are no data to be transmitted between frames, an idle flag signal is transmitted between idle frames.

A link to be switched for the variable-length synch frame is determined based on the address of a destination, and the variable-length synch frame is transmitted to a link of an adjacent node within a fixed time based on a transmission control policy which is equally applied to the nodes of the entire network. In the slot-type fixed-length synch frames, a link, fixed-length synch frame and slot to be switched are determined based on a received node and slot. The determined link, fixed-length synch frame and slot are transmitted to a link of an adjacent node within a fixed time, just as the variable-length synch frame. For the asynch frames, a link to be switched is determined based on a destination address, and if the asynch frames cannot be transmitted to the link to be switched within a cycle time during transmission control, they should wait in a queue for the next cycle time.

Figure 3:
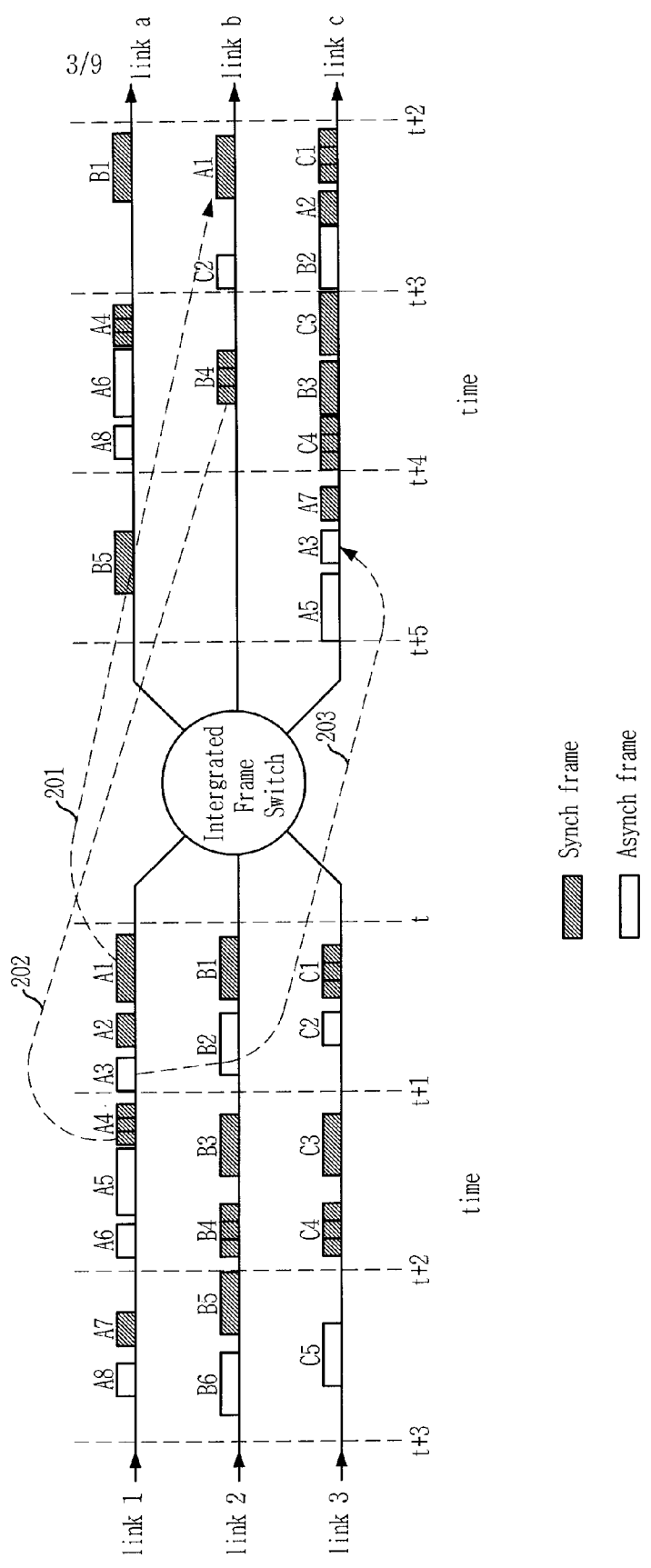
FIG. 3 is a diagram illustrating integrated frame switching of a synch frame and an asynch frame in the customized-quality transport network of FIG. 1.

FIG. 3 is a diagram illustrating integrated frame switching of a synch frame and an asynch frame in the customized-quality transport network of FIG. 1.

Referring to FIG. 3, three receiving links 1, 2 and 3 and three transmitting links a, b and c show switching between nodes connected to adjacent nodes.

First, an integrated synch and asynch frame switch performs switching on synch frames A1, A2, B1 and C1 received from t time to t+1 time within one cycle time and then transmits them to corresponding links at a cycle time from t+2 time to t+3 time. Subsequently, it switches variable-length synch frames received at a cycle time from t+1 time to t+2 time and a cycle time from t+2 time to t+3 time within a constant cycle time and transmits the switched variable-length synch frames. For slot-type fixed-length synch frames A4, B4 and C4 received at a cycle time from t+1 time to t+2 time, the second slot of the A4 frame is exchanged with the third slot of the B4 frame. Then, switching is performed within a predetermined cycle time according to each slot of a frame and the switched frames are transmitted at a cycle time between t+3 time to t+4 time. Among asynch frames A3, B2 and C2 received between t time and t+1 time, the asynch frames B2 and C2 are transported when transmission is allowed at a cycle time of a link to be switched. However, the asynch frame A3 is delayed until there is a vacant band after synch frames of the link are transmitted. In other words, the asynch frame A3 becomes an asynch forwarding whose forwarding time is variable according to the state of link resources. As described above, switching is performed by integrating synch and asynch frames in the present embodiment of the invention.

Figure 4:
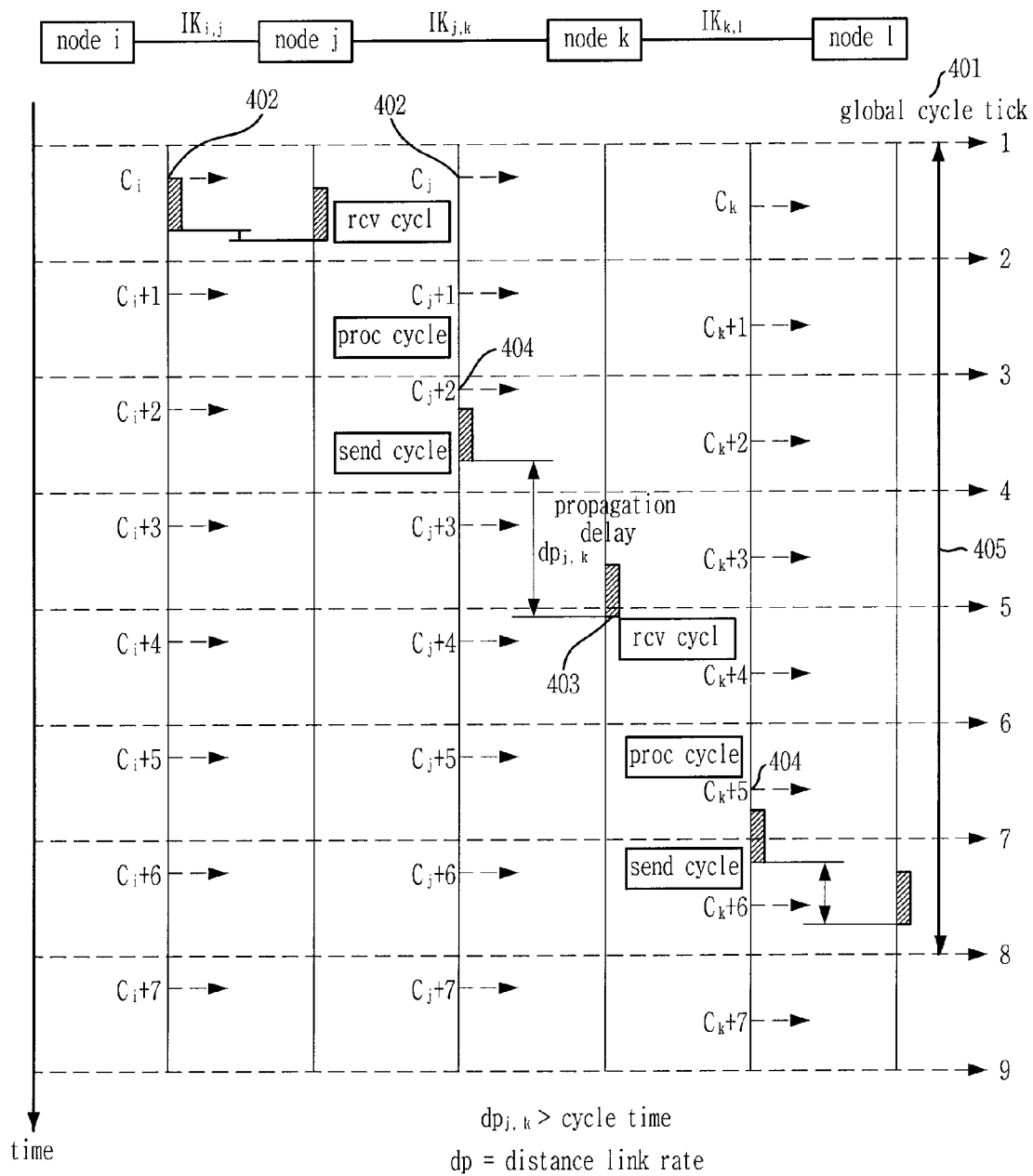
FIG. 4 is a diagram showing a synch frame switched at each node of the transport network shown in FIG. 1 and transmitted through a link.

FIG. 4 is a diagram showing a synch frame switched at each node of the transport network shown in FIG. 1 and transmitted through a link.

Referring to FIG. 4, the vertical axis denotes time while the horizontal axis denotes a node route through which frames are transported. In FIG. 4, the different distances between nodes cause propagation delay, and the distance between nodes j and k shows a case when the propagation delay lasts longer than one cycle time. In the transport network of FIG. 1, the beginning time point of a cycle time during data transmission is determined based on a cycle time provided by an area manager 401 and a cycle time 402 managed by each node independently. However, the one cycle time is the same in the nodes because the transmission bit rate is synchronized in the entire network.

Referring to FIG. 4, a synch frame transmitted from a node i at a cycle time $c_i$ arrives at a node j within one cycle time and goes through switching within one cycle time. The switched frame is transmitted at the node j at a cycle time $c_j$+2 and received by a node k at a cycle time of $c_k$+2 time to $c_k$+4 due to propagation delay. After all, it takes two cycle times (see 403). Although the reception and processing time points are different due to the propagation delay based on the distance between nodes, the switching and transmission to the next node are carried out at the same cycle time (see 404). When the propagation delay is shorter than one cycle time, end-to-end computation is possible because switching is carried out in a predetermined time, i.e., one cycle time at a transmitting node, one cycle time at a receiving node, and two cycle times at an intermediate switching node. It takes seven cycle times from the node i to a node l through the nodes j and k (see 405) including one cycle time at the node i, two cycle times at the node j, three cycle times at the node k including the propagation delay, and one cycle time at the node l. Thus, when the number of switching nodes in an end-to-end route and the transmission distance between nodes are known, the integrated synch and asynch frame switch determines an end-to-end delay and performs switching having a characteristic that fixed delay is maintained until call cancellation. Herein, "the number of switching nodes in an end-to-end route and the transmission distance between nodes" are determined based on the user service characteristics and user requested service quality, which will be described later.

Figure 5:
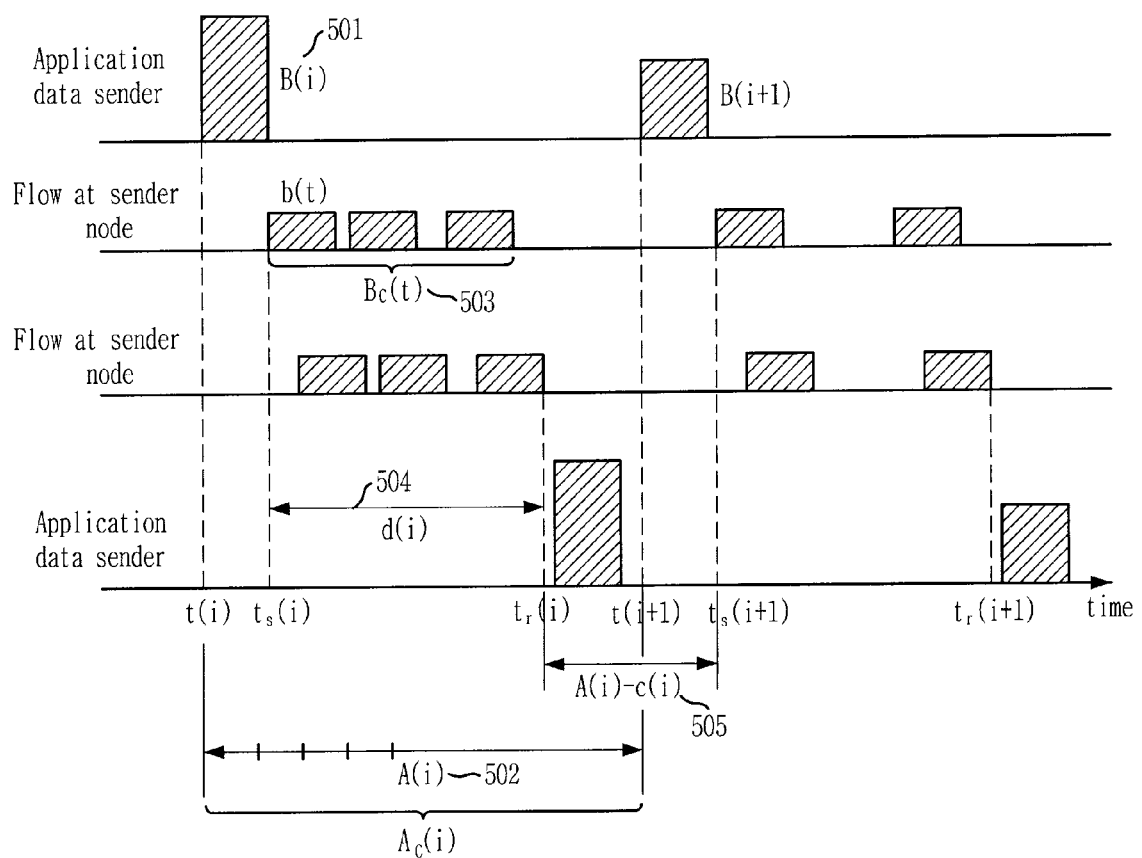
FIG. 5 is a diagram describing a method for representing user service characteristics to occupy resources according to user service characteristics and user requested service quality and a method for determining a requested quality.

FIG. 5 is a diagram describing a method for representing user service characteristics to occupy resources according to user service characteristics and user requested service quality and a method for determining a requested quality.

The characteristics of the transport network suggested in the embodiment of the present invention are defined based on the size of user data generated in a user service to defined the characteristics of the user service in the viewpoint of the transport network and the distances between data. When the size of data requested to be transmitted by the user service in an i time is B(i) (see 501) and the user service is defined to make a request to transmit as many data as B(i+1) in a i+1 time after A(i) time (see 502), the characteristics of all user services can be known by representing the size of data requested to be transported at once and the time taken until the generation of the next data in the form of a probability. The user data are divided into a plurality of frames according to the transport ability of the transport network, and the divided frames are transported in the size of b(i) within one cycle time throughout as many cycle times as $B_c(i)$ (see 503). The actual service quality depends on time when $B_c(i)$ frames are transported in the transport network through an end-to-end link and delayed, and the final frame arrives to be used for the generation of user data (see 504). Herein, the time dominating the service quality includes time taken after data retransmission due to omission of a frame until the data are recovered. To affect the service quality, data of a service should not only be transported through an end-to-end link but also recovered at the same interval as the original data of the service. Therefore, variance in a $(t_s(i+1)-t_r(i))-A(i)$ value affects the service quality (see 505).

A request for resource occupancy in the user service can be provided to the network by showing the size of data, data generation cycle time and user requested quality in the form of probabilities, defining in the form of profile upon a request for the service, being given directly, or applying a default value.

Figure 6:
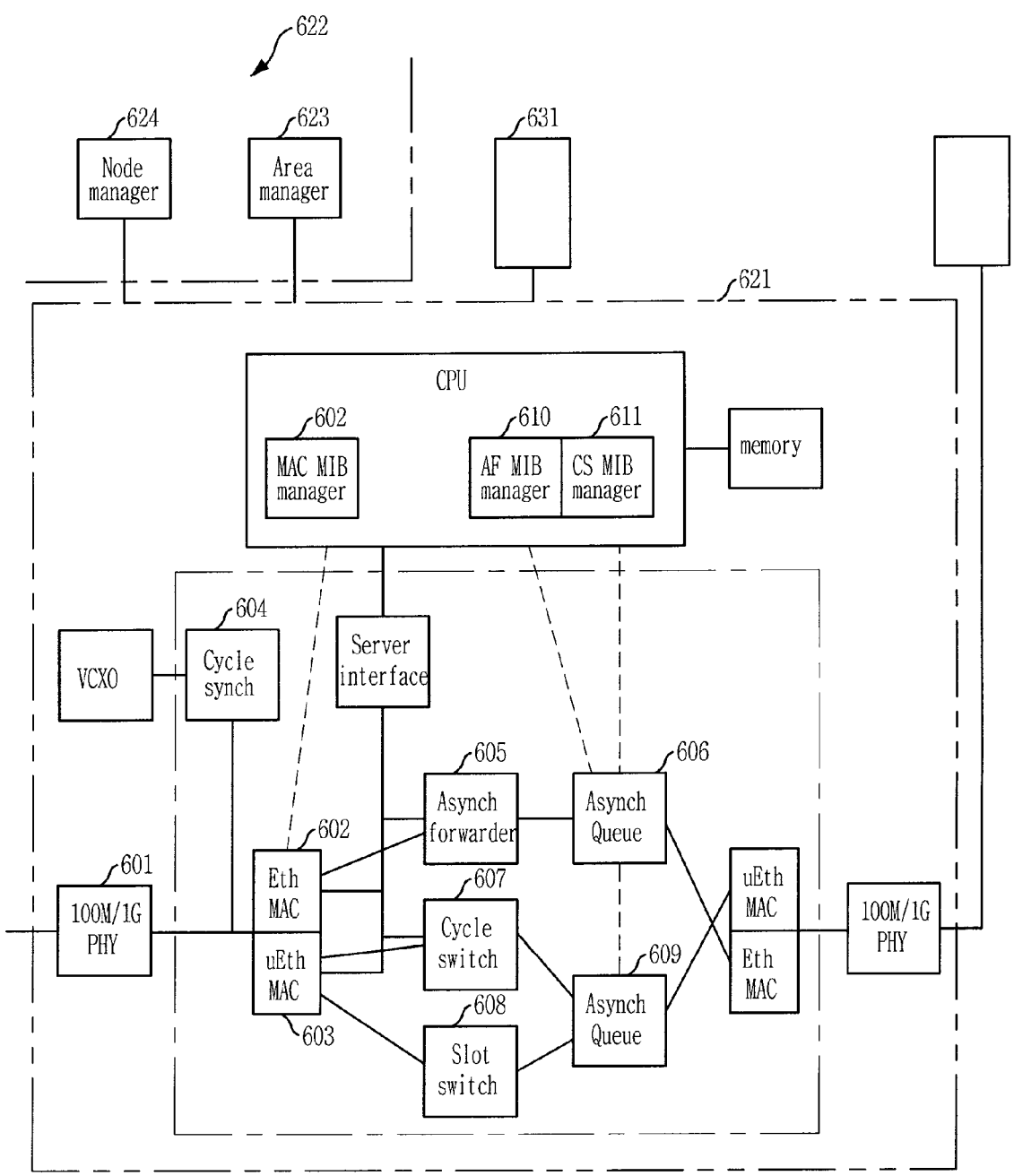
FIG. 6 is a block diagram showing a structure of integrated switch nodes of synch and asynch frames in accordance with an embodiment of the present invention.

FIG. 6 is a block diagram showing a structure of integrated switch nodes of synch and asynch frames in accordance with an embodiment of the present invention.

Referring to FIG. 6, the integrated switch node includes a data plane 621 which is connected to more than one user terminal 631 and 632 and carrys out frame switching, an area manager 623 which forms a control network of nodes within an area, determines a transport route and allocates resources for each link, and a node manager which maintains information of synch and asynch frames switching by communicating with the area manager 623.

Herein, the "area" means a group of nodes sharing network configuration information and routing information and the nodes are grouped based on regional location and average distance between the nodes.

The area manger 623 forms a control network with the nodes within the area through control frame exchange, periodically collects information on the structure of an adjacent link, i.e., link structure information of an adjacent link, and link load information, and maintains the configuration of the network and load state to use them for route selection.

The synch switching route begins to be formed by determining service profile or service characteristics through integrated synch and asynch switching Application Program Interface (API) setup in a user terminal 631 and being requested by the node manager together with the requested service quality. The node manager 624 which accommodates users requests the area manager 623 to set up a route that can satisfy the service characteristics and requested service qualities, and the area manager 623 secures a synch frame switching route by providing synch switch control information to every node managers on the determined route and informs the node managers accommodating transmitting users and receiving user that transmission is possible.

The data plane 621 includes a switch controller 602, 610 and 611 and switches 601, 602, 603, 604, 605, 606, 607, 608 and 609. The switch controllers 602, 610 and 611 manage control information of a forwarder or a synch switch so that switching between frames can be performed between ports of an actual node based on network routing information. The switches 601, 602, 603, 604, 605, 606, 607, 608 and 609 perform forwarding or switching of an actual frame and process queues or buffers for transport.

A media access control (MAC) MIB manager 602 and an asynch forwarding MIB manager 610 forms a link to port lookup table to be forwarded according to a MAC address or an IP address based on the network routing information and provides an asynch forwarder 605 with the forwarding control information. A cycle switching MIB manager 611 forms a lookup table for determining a link to be transported according to the IP addresses and input cycles of a fixed-length synch frame and a variable-length synch frame based on the synch frame routing information provided from the area controller, and provides the lookup table as control information for a cycle switch 607 and a slot switch 608.

The cycle switching MIB manager 611 synchronizes the transmission bit rate among nodes based on a synch signal transmitted and received between transmission bit rate synchronizers 604 of adjacent nodes, processes Ethernet physical layers of frames received in every cycle time in the physical layer processor 601 based on the synchronized transmission bit rate, transports the processed frames to an Ethernet processor 602. Then, the Ethernet processor 602 processes typical Ethernet frames therein according to the kind of Ethernet frames, transports synch Ethernet frames to a synch Ethernet frame processor 603. The synch Ethernet frame processor 603 identifies them whether they are control frames, slot-type fixed-length synch frames, and/or variable-length synch frames, and transports them to the node controller, the area controller, the slot switch, and/or the synch switch, respectively. Typical Ethernet asynch frames are forwarded from the asynch forwarder 605 to a corresponding port based on the lookup table of the MAC address or IP address, queued into an asynch queue 606 and stored therein until they are transported. The cycle switch 607 switches synch frames into a corresponding cycle of a link of an adjacent node within a fixed time according to the kind of a synch frame; or the slot switch 608 switches a slot of a slot-type fixed-length frame into a corresponding slot of a frame in a corresponding link. The synch frames stay in a synch buffer 609 to be transported within a fixed time.

Figure 7:
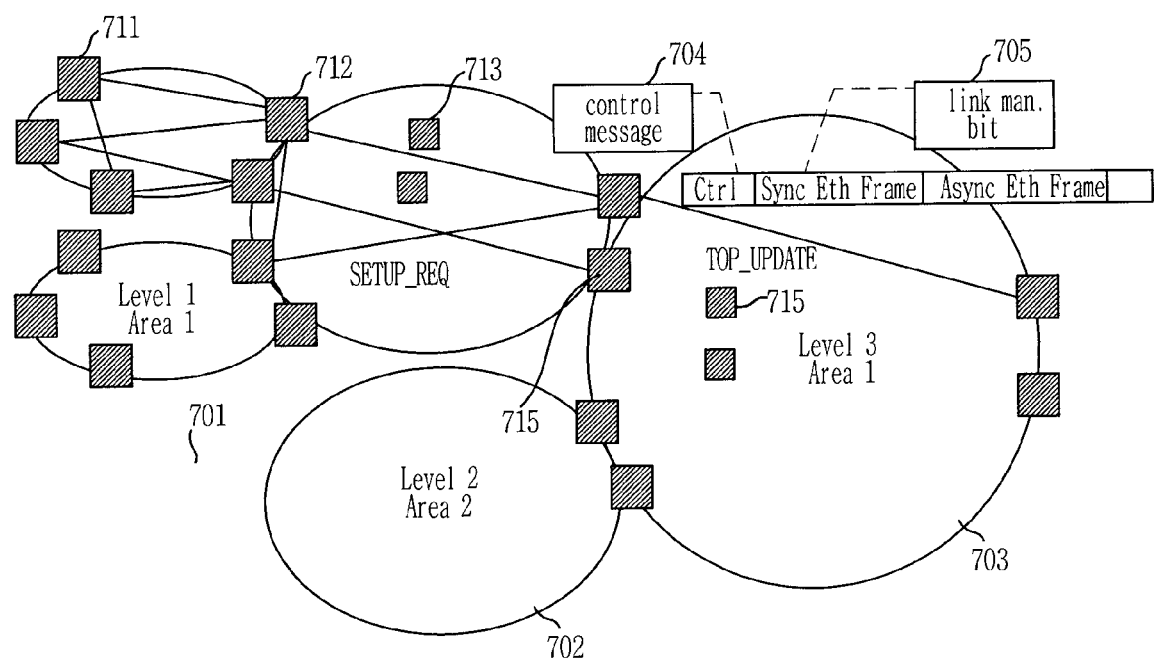
FIG. 7 is an exemplary diagram showing a control network of a transport network for synchronizing network information.

FIG. 7 is an exemplary diagram showing a control network of a transport network for synchronizing network information.

To synchronize the network information, the control network collects the nodes of the network in a hierarchical multiple areas and configures them into a level 1 area control network 701 formed of nodes 711 of a level 1, a level 2 area control network 702 formed of an area manger 712 of the level 1 and nodes 713 of a level 2, and a level 3 area control network 703 formed of an area manager 714 of the level 2 and nodes 715 of the level 3. Each of the area control networks maintains the information synchronization, as the area managers switches control messages using control frames periodically transported between nodes of each area and collects bitwise link state information 705 provided by the synch frames and periodically provides them to the nodes of each area. An area is a group of nodes sharing the network configuration information and routing information based on regional location and average distance between nodes, and the number of nodes forming an area is different according to the level of the entire network. In the area control networks, initialization processes, such as finding an adjacent node, finding the area manager, and initializing information of the area, are carried out, as control frames are switched between the area manager and the node manager. The area manager collects adjacent link information of a node and link load information, sets up a route between a transmitting node and a receiving node in the area and distributes bandwidths.

Figure 8:
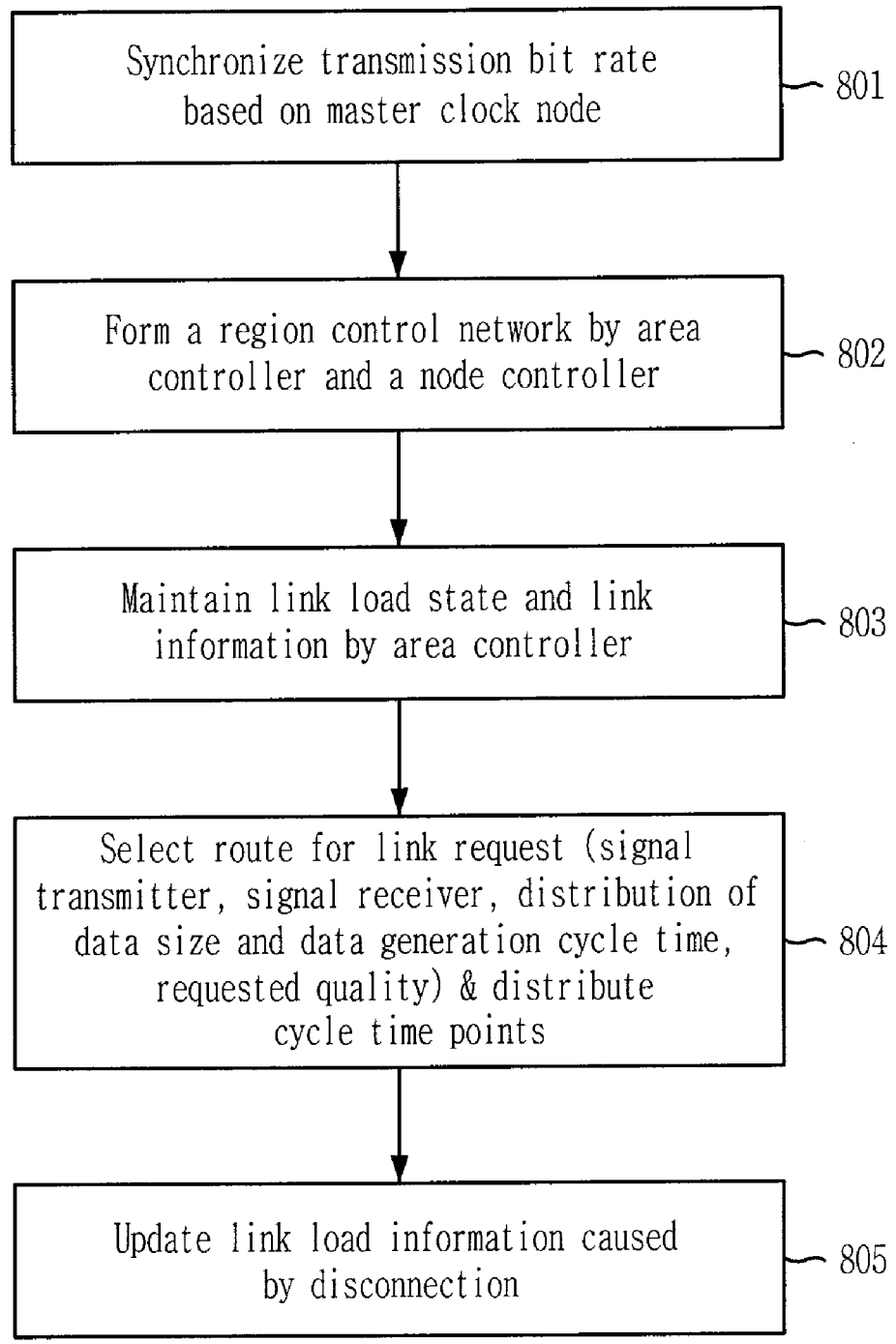
FIG. 8 is a flowchart describing processes of configuring a control network and distributing resources in an area manger of FIG. 6.

FIG. 8 is a flowchart describing the processes of configuring the control network and distributing the resources, which are performed by the area manager of FIG. 6.

Referring to FIG. 8, in step 801, a predetermined node having a master clock transmits a synchronization signal for synchronizing the transmission bit rate to an adjacent node. The adjacent node relays the synchronization signal to another adjacent node and synchronizes the transmission bit rate of the area in a predetermined time. A node in charge of controlling the area within the area can be designated as a primary or secondary area controlling node based on initial data generated by the network configuration manager, and it is selected by comparing the addresses of node mangers initially designated in the area with each other.

In step 802, an area manager of the node controlling the area, which will be referred to as an area controlling node hereinafter, broadcasts a node information report request for configuring an area control network to adjacent nodes and configures an area control network based on information of a node which responds to the node information report request.

In step 803, the area manager receives a report on the link load state and link information at a predetermined cycle time or when there is a change, and updates the information on the state of link resources within the area. Also, when the area manager of the area control node receives a connection request from the node manager, in step 804, it determines a link route by selecting a route connecting a signal transmitter and a signal receiver and a data frame transport cycle of a link of the route according to the quality of the connection request and transporting them to the nodes of the route. In step 805, when the area manager of the area control node receives a disconnection request from the node manager, it changes the link state information and the link cycle load state information.

Figure 9:
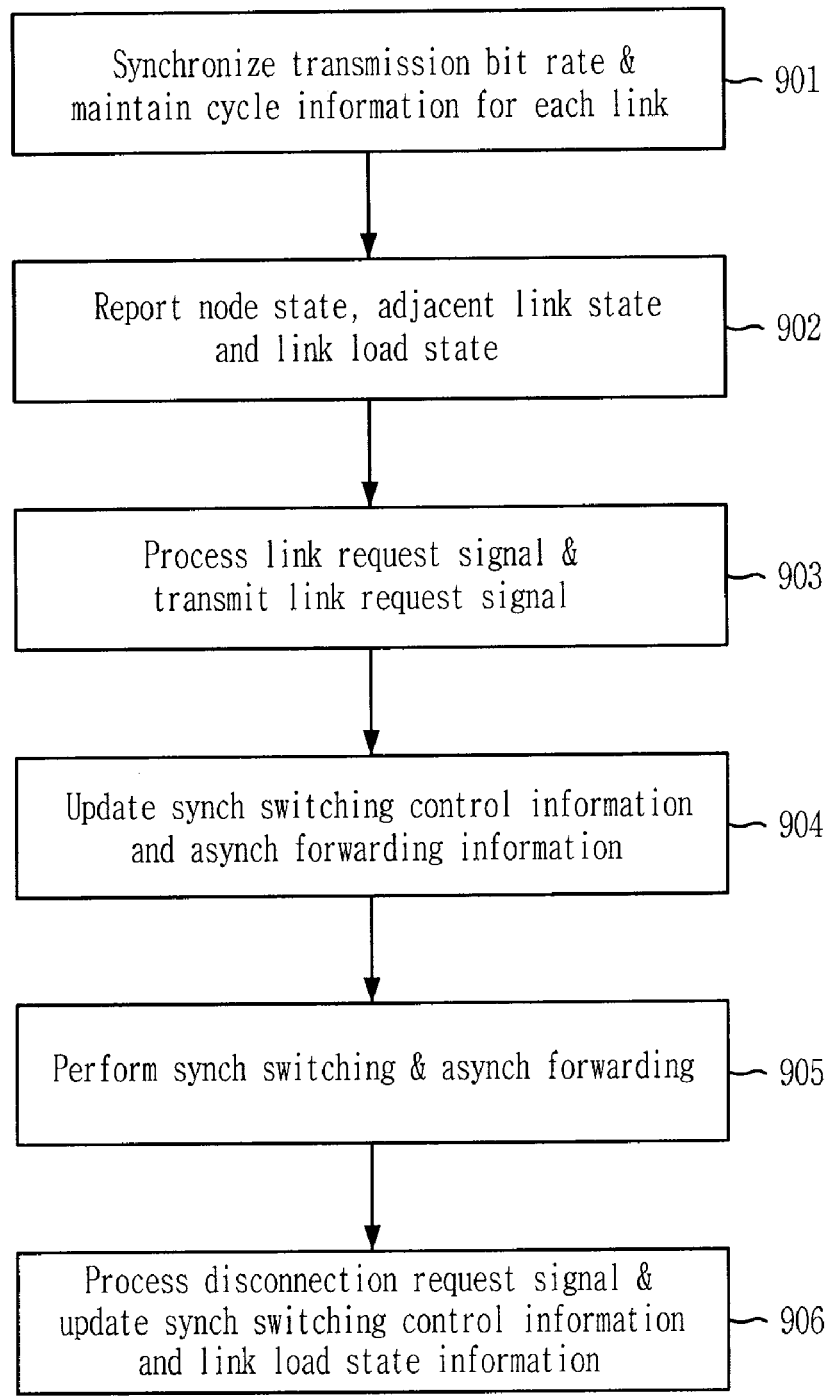
FIG. 9 is a flowchart illustrating functions of a node manager shown in FIG. 6.

FIG. 9 is a flowchart illustrating functions of the node manager shown in FIG. 6. The node manager transports a synchronization signal for synchronizing the transmission bit rate transmitted form the adjacent nodes to the area manager, relays the synchronization signal to adjacent nodes, adjusts the transmission bit rate or synchronizes the transmission bit rate with the adjacent nodes based on the information of the received synchronization signal. In step 901, the node manager of the area control node determines and maintains cycle time points for each link of the area. When the transmission bit rate is synchronized and the cycle time point is maintained, in step 902, the node manager reports node information, adjacent link state, and link load state to the area manager when the area manager requests the node manager to or when there is a change in the state so that the area manager can manage the network information. When the node manager receives a connection request from a user port connected to the node or from an adjacent node, in step 903, it transports the connection request to the link manager. When a link is set up with the user port or the adjacent node, in step 904, the node manager updates a corresponding table, as the area manager requests the node manager to send synch switching control information and asynch forwarding information or as the area manager makes the request periodically. After the link is set up, in step 905, the node manager divides frames transmitted from the outside into synch frames and asynch frames and performs synch switching based on cycle exchange in a predetermined time and performs asynch forwarding based on queuing. When there is no influx of frames for a predetermined time, in step 906, the node manager generates a disconnection request signal and sends it to the area manager, or it changes the distribution state of link resources by receiving synch switching control information from the area manager.

The technology of the present invention can be realized as a program and stored in a computer-readable recording medium, such as CD-ROM, RAM, ROM, floppy disks, hard disks, and magneto-optical disks. Since the process can be easily implemented by those skilled in the art of the present invention, further description on it will not be provided herein.

While the present invention has been described with respect to certain preferred embodiments, it will be apparent to those skilled in the art that various changes and modifications may be made without departing from the scope of the invention as defined in the following claims.

INDUSTRIAL APPLICABILITY

The technology of the present invention can be applied to integrated network systems.

What is claimed is:

1. A method for forming an integrated transport network based on synch and asynch frames in a communications network comprising an area manager and a plurality of nodes, the method comprising the steps of:
   a) setting up a connection using an area manager by determining a route between a source and a destination of the transport network based on a quality of a connection request, where nodes of the transport network are adjacently connected to each other;
   b) repeatedly controlling frame transmission along the connection route at a predetermined cycle time using nodes of the communications network while a transmission bit rate of the transport network is synchronized; and
   c) updating frame switching information at multiple number times of the cycle time for frame transmission control using the area manager,
   wherein a frame in a time section for updating the frame switching information includes:
   a data frame for sending user data in an end-to-end link, and a control frame for sending control data within the transport network, at least one control frame being included in the time section for updating frame switching information.

2. The method as recited in claim 1, wherein the synch frames are identified as variable-length synch frames or slot-type fixed length synch frames and transmitted.

3. A method for transporting synch and asynch frames in a communications network comprising a plurality of nodes, the method comprising the steps of:
   a) synchronizing a transmission bit rate in a network using nodes of the communications network;
   b) when the transmission bit rate is synchronized in the network and a connection request is received, setting up a connection using an area manager by determining a route between a source and a destination and a start cycle time at the source based on a quality of the connection request and transporting a virtual cycle time information to nodes on the route; and
   c) after the connection is set up, transmitting data requested to be transported to an adjacent node using a node of the communications network, wherein the data is transmitted within the virtual cycle time based on a transmission control policy that is equally applied to the entire nodes of the network when the data are synch frames; or when the data are asynch frames and the data can not be transmitted within a virtual cycle time of a link to be switched, keeping the data waiting for a next cycle time and transmitting the data using a node of the communications network at the next cycle time.

4. The transporting method as recited in claim 3, wherein the step a) includes the steps of:
   a1) configuring the nodes of the network in hierarchical multiple areas;
   a2) transporting a synchronization signal for synchronizing the transmission bit rate from a node having a master clock to adjacent nodes in an area control network of each of the formed hierarchical areas; and
   a3) synchronizing the transmission bit rate of the area control network by relaying the synchronization signal from the node that has received the synchronization signal to another adjacent node and repeating the relay for a predetermined time until the transmission bit rate is synchronized.

5. The transporting method as recited in claim 4, wherein a node information request is broadcasted to adjacent nodes, and an area control network is formed based on information of a node which responds to the node information request.

6. The transporting method as recited in claim 3, wherein the quality of the connection request is determined based on the size of user data generated at once and a cycle time that the user data are generated.

7. The transporting method as recited in claim 3, wherein the quality of the connection request is determined based on time measured after $i^{th}$ user data arrive at a destination until $(i+1)^{th}$ data are transmitted from a source wherein i is an integer.

8. The transporting method as recited in claim 3, wherein an end-to-end delay determined based on the number of switching nodes of an end-to-end route and transmission distance between nodes is maintained until call cancellation in the synch frame transmission.

9. The transporting method as recited in claim 4, wherein the area control networks are formed based on exchange of control messages using control frames of the nodes and bit-wise link state information provided by the synch frames.

10. An apparatus for forming an integrated transport network for transporting synch and asynch frames, comprising:
   an area manager for transmitting/receiving a synchronization signal for synchronizing a transmission bit rate of a network, forming area control networks by switching control frames with nodes in a predetermined area, and setting up a virtual cycle time and a connection according to a quality required from a user;
   a node manager for maintaining synchronous and asynchronous frames switching information by communicating with the area manager, and performing synch switching based on cycle exchange in a predetermined time and asynch forwarding based on queuing; and
   a data plane for switching user frames under control of the area manager and the node manager.

11. The transport network forming apparatus as recited in claim 10, wherein the area manager broadcasts a node information request to adjacent nodes and forms area control networks based on information of a node which responds to the node information request.

12. The transport network forming apparatus as recited in claim 10, wherein the node manager requests the area manager to set up a route that satisfies the quality of a service requested by a user terminal, and receives and manages synch switching control information and asynch forwarding information transmitted from the area manager.

13. The transport network forming apparatus as recited in claim 10, wherein user data are identified as synch frames or asynch frames.

14. The transport network forming apparatus as recited in claim 11, wherein, when user frames of data are synch frames, the data plane transmits the user frames of data to a link of an adjacent node based on a transmission control policy which is equally applied to the nodes of the network within the virtual cycle time; or, when the user frames of data are asynch frames and the user frames of data are not transmitted within the virtual cycle time of a link to be switched, the data plane keeps the user frames of data waiting for a next cycle time and transmits the user frames of data in the next cycle time.

15. The transport network forming apparatus as recited in claim 10, wherein the area control networks are formed by forming the nodes of the network in multiple areas, transporting a synchronization signal for synchronizing the transmission bit rate from a node having a master clock in an area control network of each area to an adjacent node, relaying the synchronization signal to another adjacent node and repeating the relaying process for a predetermined time until the transmission bit rate is synchronized in the area.

16. The transport network forming apparatus as recited in claim 15, wherein the hierarchical multiple areas are formed by broadcasting a node information request to adjacent nodes and forming area control networks based on information of nodes which respond to the node information request.

17. The transport network forming apparatus as recited in claim 10, wherein the quality of the connection request from a user is determined based on the size of user data generated at once and a cycle time that the user data are generated.

18. The transport network forming apparatus as recited in claim 10, wherein the quality of the connection request is determined based on time measured after $i^{th}$ user data arrive at a destination until $(i+1)^{th}$ data are transmitted from a source, wherein i is an integer.

* * * * *